United States Patent
Srivastava et al.

(10) Patent No.: US 10,819,646 B2
(45) Date of Patent: Oct. 27, 2020

(54) SYSTEMS AND METHODS FOR DISTRIBUTING UNUSED BANDWIDTH OF METERED FLOWS IN AN ENVELOPE BASED ON WEIGHTS

(71) Applicant: Ciena Corporation, Hanover, MD (US)

(72) Inventors: Vaibhav Srivastava, Gurgaon (IN); Gautam Khetrapal, New Delhi (IN); Marc Holness, Nepean (CA); Jeffrey Randal Norman, Kanata (CA)

(73) Assignee: Ciena Corporation, Hanover, MD (US)

( * ) Notice: Subject to any disclaimer, the term of this patent is extended or adjusted under 35 U.S.C. 154(b) by 57 days.

(21) Appl. No.: 16/205,281

(22) Filed: Nov. 30, 2018

(65) Prior Publication Data
US 2020/0127932 A1  Apr. 23, 2020

(30) Foreign Application Priority Data
Oct. 18, 2018 (IN) .............................. 201811039558

(51) Int. Cl.
*H04L 12/877* (2013.01)
*H04L 12/927* (2013.01)
*H04L 12/873* (2013.01)

(52) U.S. Cl.
CPC .......... *H04L 47/525* (2013.01); *H04L 47/527* (2013.01); *H04L 47/805* (2013.01)

(58) Field of Classification Search
None
See application file for complete search history.

(56) References Cited

U.S. PATENT DOCUMENTS

| | | | | |
|---|---|---|---|---|
| 9,866,408 | B2* | 1/2018 | Latham | H04L 12/4675 |
| 10,015,057 | B2* | 7/2018 | Djukic | H04L 41/142 |
| 2005/0135378 | A1* | 6/2005 | Rabie | H04L 47/10 |
| | | | | 370/395.21 |
| 2006/0215558 | A1* | 9/2006 | Chow | H04L 47/20 |
| | | | | 370/232 |
| 2008/0112318 | A1* | 5/2008 | Groleau | H04L 47/10 |
| | | | | 370/230.1 |
| 2008/0298243 | A1* | 12/2008 | Martinotti | H04L 47/20 |
| | | | | 370/235 |

(Continued)

OTHER PUBLICATIONS

MEF Technical Specification, MEF 10.3, Ethernet Services Attributes Phase 3, Oct. 2013, pp. 1-120.

*Primary Examiner* — Andre Tacdiran
(74) *Attorney, Agent, or Firm* — Clements Bernard Walker; Lawrence A. Baratta, Jr.; Christopher L. Bernard

(57) ABSTRACT

System and methods of ingress packet metering include receiving a plurality of flows combined to form an envelope with a specific bandwidth, wherein the envelope is defined such that unused bandwidth from higher rank flows is usable by lower rank flows; admitting packets from the plurality of flows based on committed tokens and excess tokens; determining unused tokens in a time interval; and distributing the unused tokens based on configured weights of the plurality of flows within the envelope. The unused tokens can be provided from a lower rank flow to a higher rank flow. The unused tokens can be determined utilizing Two Rate Three Color Marker (trTCM) metering. The receiving can be at a User-Network Interface (UNI), a Network-Network Interface (NNI), or an External NNI (ENNI) port in a node.

17 Claims, 5 Drawing Sheets

(56) References Cited

U.S. PATENT DOCUMENTS

| | | | | |
|---|---|---|---|---|
| 2010/0195492 A1* | 8/2010 | Harmatos | ............... | H04L 47/20 |
| | | | | 370/230 |
| 2011/0096666 A1* | 4/2011 | Davari | .................... | H04L 47/10 |
| | | | | 370/235 |
| 2014/0321284 A1* | 10/2014 | Racz | ....................... | H04L 47/31 |
| | | | | 370/235.1 |
| 2015/0236955 A1* | 8/2015 | Bottorff | .................. | H04L 47/33 |
| | | | | 370/235 |
| 2016/0380903 A1* | 12/2016 | Cai | ..................... | H04L 12/6418 |
| | | | | 370/235 |
| 2017/0208009 A1* | 7/2017 | Agarwal | ............... | H04L 47/215 |
| 2018/0098248 A1* | 4/2018 | Torres | .................. | H04L 47/823 |

* cited by examiner

SYSTEMS AND METHODS FOR DISTRIBUTING UNUSED BANDWIDTH OF METERED FLOWS IN AN ENVELOPE BASED ON WEIGHTS

FIELD OF THE DISCLOSURE

The present disclosure generally relates to packet networking. More particularly, the present disclosure relates to systems and methods for distributing unused bandwidth of metered flows in an envelope based on weights.

BACKGROUND OF THE DISCLOSURE

Packet metering was introduced in IEEE 802.1ad-2005 with a Drop Eligible Indicator (DEI) and in IEEE 802.1Q-2011 with a Canonical Format Indicator (CFI) to allow for packet "color" (drop eligibility). A packet's color is different from its priority. Priority is an inherent characteristic of a packet, determined by the contents. Different priorities can be mapped to different traffic classes, queued in different queues, and do not need an order to be maintained between packets of different priorities. Color, on the other hand, is not an inherent characteristic of a packet and is determined based on the arrival time at a meter relative to the history of arrival times of previous packets. Frames within a traffic class can be marked in different colors. An exemplary three color system utilizes Green, Yellow, and Red. Green can be for committed packets, Yellow for excess packets, and Red for non-conformant (discard) packets which are discarded.

Metro Ethernet Forum (MEF) Technical Specification 10.3 "Ethernet Services Attributes Phase 3" October 2013, the contents of which are incorporated by reference herein, defines a bandwidth profile algorithm where a set of flows can be tied together to form an envelope and unused bandwidth from a higher rank flow can be shared by a lower rank flow within the envelope. Definition of the envelope and bandwidth profile flow is defined Section 12 of MEF 10.3. However, the bandwidth profile algorithm in MEF 10.3 is a metering algorithm where the distribution of unused bandwidth is unpredictable, i.e., on a first come first serve basis. Also, the sharing approach in MEF 10.3 is based on cascading technique where unused tokens from higher rank flows flow towards lower rank flows, but these cannot be distributed dynamically.

Another approach could be to utilize an egress shaper and Weighted Round Robin (WRR) scheduler where bandwidth can be distributed based on weights. However, the egress shaper and WRR scheduler mechanism is at egress and cannot be applied to cases where distribution is required per microflows such as multipoint-to-point and multipoint-to-multipoint scenarios where metering is required at the ingress, and same behavior cannot be achieved using egress scheduler and shaper.

BRIEF SUMMARY OF THE DISCLOSURE

In an embodiment, a method of ingress packet metering includes receiving a plurality of flows combined to form an envelope with a specific bandwidth, wherein the envelope is defined such that unused bandwidth from higher rank flows is usable by lower rank flows; admitting packets from the plurality of flows based on committed tokens and excess tokens; determining unused tokens in a time interval; and distributing the unused tokens based on configured weights of the plurality of flows within the envelope. The unused tokens can be provided from a lower rank flow to a higher rank flow. The unused tokens can be determined utilizing Two Rate Three Color Marker (trTCM) metering. The receiving, the admitting, and the determining can be performed at a User-Network Interface (UNI), a Network-Network Interface (NNI), or an External NNI (ENNI) port in a node. Each of the plurality of frames can be a set of service frames arriving at a User-Network Interface (UNI), a Network-Network Interface (NNI), or an External NNI (ENNI) port that meets a specific criterion. The determining unused tokens can include computing overflow tokens of each of the plurality of weighted flows; and summing the overflow tokens for each of the plurality of weighted flows. The distributing the unused tokens can be based in part on a cascade metering algorithm in MEF 10.3 which is modified to support weights for each of the plurality of flows.

In another embodiment, node includes a plurality of ports; and a switch fabric between the plurality of ports, wherein a port is configured to receive a plurality of flows combined to form an envelope with a specific bandwidth, wherein the envelope is defined such that unused bandwidth from higher rank flows is usable by lower rank flows, wherein packets are admitted from the plurality of flows based on committed tokens and excess tokens, unused tokens are determined in a time interval, and the unused tokens are distributed based on configured weights of the plurality of flows within the envelope. The unused tokens can be provided from a lower rank flow to a higher rank flow. The unused tokens can be determined utilizing Two Rate Three Color Marker (trTCM) metering. The port can be a User-Network Interface (UNI), a Network-Network Interface (NNI), or an External NNI (ENNI) port. Each of the plurality of frames can be a set of service frames arriving at a User-Network Interface (UNI), a Network-Network Interface (NNI), or an External NNI (ENNI) port that meets a specific criterion. The unused tokens can be determined by a computation of overflow tokens for each of the plurality of weighted flows and a summation of the overflow tokens for each of the plurality of weighted flows. The unused tokens can be distributed in part on a cascade metering algorithm in MEF 10.3 which is modified to support weights for each of the plurality of flows.

In a further embodiment, an apparatus includes circuitry configured to receive a plurality of flows combined to form an envelope with a specific bandwidth, wherein the envelope is defined such that unused bandwidth from higher rank flows is usable by lower rank flows; circuitry configured to admit packets from the plurality of flows based on committed tokens and excess tokens; circuitry configured to determine unused tokens in a time interval; and circuitry configured to distribute the unused tokens based on configured weights of the plurality of flows within the envelope. The unused tokens can be provided from a lower rank flow to a higher rank flow. The unused tokens can be determined utilizing Two Rate Three Color Marker (trTCM) metering. The circuitry configured to receive can be at a User-Network Interface (UNI), a Network-Network Interface (NNI), or an External NNI (ENNI) port in a node. Each of the plurality of frames can be a set of service frames arriving at a User-Network Interface (UNI), a Network-Network Interface (NNI), or an External NNI (ENNI) port that meets a specific criterion. The unused tokens can be distributed in part on a hierarchal metering algorithm in MEF 10.3 which is modified to support weights for each of the plurality of flows.

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

Figure 1:
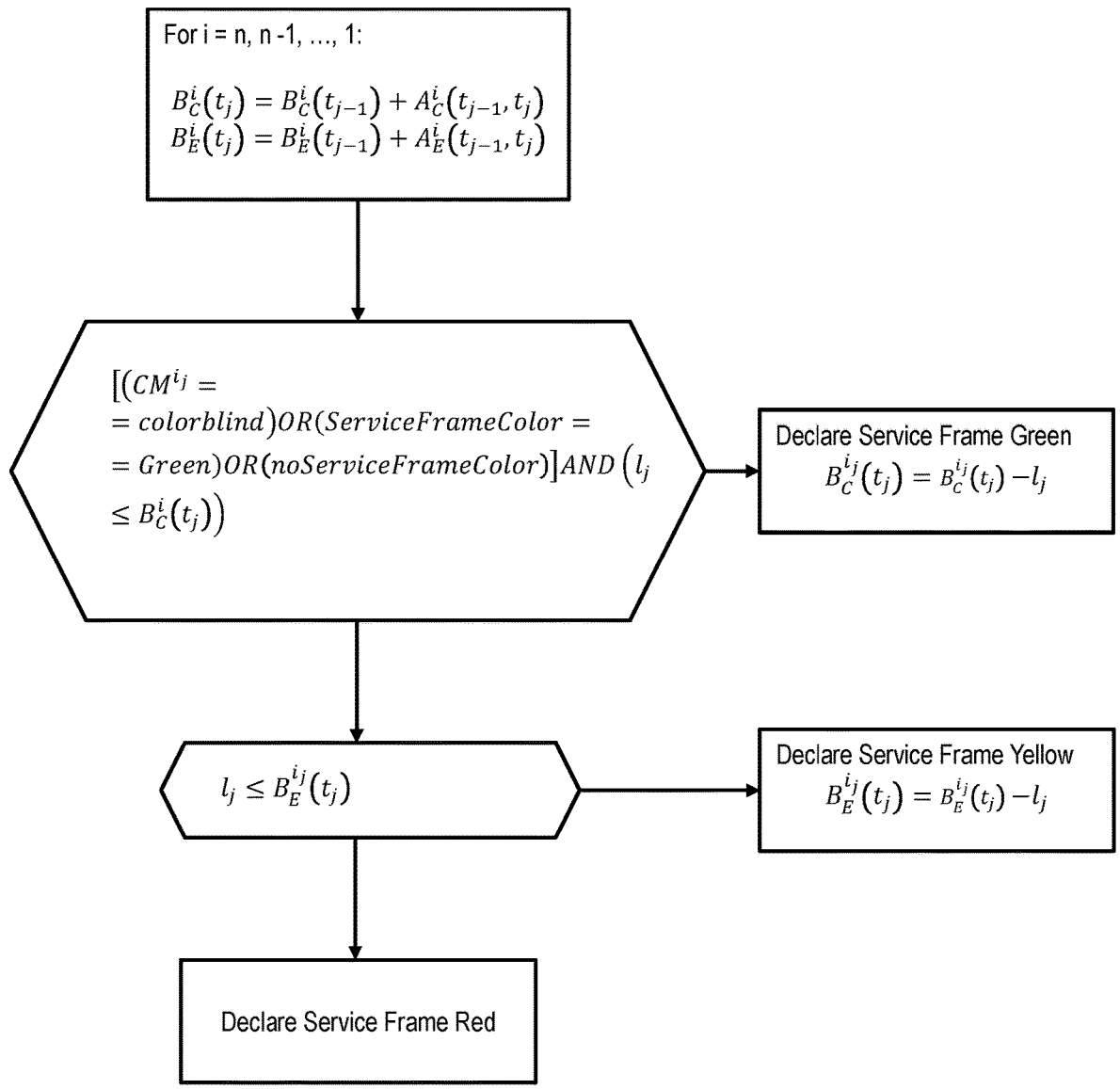
FIG. 1 is a flowchart of the MEF 10.3 metering approach.

The present disclosure relates to systems and methods for distributing unused bandwidth of metered flows in an envelope based on weights. The systems and methods provide flexibility to the customers to manage the unused bandwidth. Again, MEF 10.3 has already defined an algorithm to share the unused bandwidth from a higher rank flow to a lower rank flow (i.e., a waterfall or cascading model). The systems and methods utilize this waterfall or cascading model in the existing MEF 10.3 algorithm with modifications such that the metering algorithm can take advantage of setting a maximum rate in terms of percentage or weight of the total unused bandwidth. The systems and methods include the summation of all the unused tokens calculated in a small time interval ($t_2-t_1$), and the total unused tokens are distributed based on configured weights of the flows (only for flows which are configured with weights) within the envelope or macro-meter. Unused tokens are calculated based on a Two Rate Three Color Marker (trTCM) metering algorithm. The systems and methods can also be used in combination with flows configured with absolute value. The systems and methods are defined in such a way that unused tokens are distributed fairly among higher and lower rank flows per weights assigned to adapt to the dynamic traffic pattern, leading to better utilization of unused bandwidth within the envelope. This is in contrast to MEF 10.3 cascade token sharing which is based on absolute values and unused bandwidth sharing within the envelope is inefficient.

BACKGROUND

One example metering algorithm is described in Internet Engineering Task Force (IETF) Request for Comments (RFC) 4115 (July 2005), "A Differentiated Service Two-Rate, Three-Color Marker with Efficient Handling of in-Profile Traffic," the contents of which are incorporated herein by reference. Note, the term packet can also reference a frame as described herein. RFC 4115 defines the behavior of a meter in terms of its mode and two token buckets, C and E (Committed and Excess, respectively, note C=Green and E=Yellow), with the rates, CIR (Committed Information Rate) and EIR (Excess Information Rate), respectively, and maximum sizes CBS (Committed Burst Size) and EBS (Excess Burst Size). The token buckets C and E are initially (at time 0) full; i.e., the token count $T_c(0)$=CBS and $T_e(0)$=EBS. Thereafter, the token count $T_c$ is incremented by one CIR times per second (up to CBS), and the token count $T_e$ is incremented by one EIR times per second (up to EBS).

Again, MEF 10.3 has defined an algorithm where a set of flows can be tied together to form an envelope and unused bandwidth from a higher rank flow can be shared by a lower rank flow within the envelope. This is defined, e.g., in Sec. 12 in MEF 10.3. An envelope is a set of n bandwidth profile flows in which each bandwidth profile flows is assigned a unique rank between 1 (lowest) and n (highest), n can be any positive integer. A bandwidth profile flow is a defined as a set of service frames arriving at a User-Network Interface (UNI), a Network-Network Interface (NNI), or an External NNI (ENNI) port that meets a specific criterion. The example criterion in MEF 10.3 include:

1. All ingress Service Frames at the UNI that are not discarded per requirements [R69], [R70], [R89], [R128], [D1], [D2], or any of the conditions specified per [R16],
2. All ingress Service Frames at the UNI that are mapped to a given EVC and that are not discarded per requirements [R69], [R70], [R89], [R128], [D1], [D2], or any of the conditions specified per [R16],
3. All ingress Service Frames at the UNI that have a given Class of Service Name, that map to a given EVC, and that are not discarded per requirements [R69], [R70], [R89], [R128], [D1], [D2], or any of the conditions specified per [R16],
4. All egress Service Frames at the UNI,
5. All egress Service Frames at the UNI that are mapped to a given EVC, or
6. All egress Service Frames at the UNI that have a given Egress Equivalence Class and that map to a given EVC.

The lower rank flow can either consume all the unused tokens from a higher rank flow or can be limited by the maximum rate value of that flow. $CIR_{max}$ is the maximum rate by which the tokens can be added to the committed token bucket and defined by the MEF 10.3. $EIR_{max}$ is also defined in the standard for excess token bucket.

The number of unused tokens is calculated at every small-time interval and then made available to other flows based on the configured maximum rate value for the next time interval.

$CIR_{max}$ and $EIR_{max}$ are defined as an absolute value in the algorithm and cannot be adjusted dynamically.

There are other metering algorithms such as hierarchal metering which also define the sharing approach, however, the unused bandwidth shared among the microflows is unpredictable.

MEF Implementation Agreement 23.2.1 "Models for Bandwidth Profiles with Token Sharing," Jan. 24, 2017, the contents of which are incorporated by reference herein, has also defined the models for bandwidth profiles with token sharing and explained different examples of the defined models.

There are two aspects of note—one is sharing of unused bandwidth, and the other one is how the unused bandwidth is shared among the rest of the flows. Hierarchal metering and MEF 10.3 envelope metering have defined how to share the unused bandwidth, but there is no suggestion of where unused bandwidth can be distributed based on some weight or percentage of the total unused bandwidth among the rest of the flows (distribute unused bandwidth dynamically).

As a traffic pattern changes dynamically, a customer may want that the usage of unused bandwidth also to be adjusted dynamically.

In practice, customers need to define the maximum allowed bandwidth along with the guaranteed bandwidth so that a single flow cannot consume all the unused bandwidth but if the unused bandwidth from higher rank flows is less than the configured maximum allowed bandwidth of a flow then it cannot be distributed among all the lower rank flows and consumed by the single flow. Currently, there is no way to distribute the unused bandwidth of an envelope based on weights among the bandwidth profile flows within the envelope. This forces a user to pre-calculate the sharing portion of unused bandwidth for each flow, but this cannot be adjusted dynamically.

Another disadvantage of distributing the unused bandwidth using cascade token mechanism (MEF 10.3) is that a higher rank flow cannot utilize the unused bandwidth of lower rank flows whereas, in hierarchical metering, the sharing amount is unpredictable.

Another technique to distribute the bandwidth based on weights is the use of hierarchal egress queues and scheduler. But in that case, a scheduler will combine the separate individual flows into one or more larger flows and cannot assign different weights on a per flow basis. In the case of "multipoint to point" or "multipoint to multipoint" configurations, ingress metering is required to limit the traffic at the ingress to give fair bandwidth allocation to different customers whereas the behavior cannot be achieved using egress scheduler.

Metering Algorithm for an Envelope with Unused Bandwidth Distributed Based on the Weight The objective is to define a metering algorithm where unused bandwidth can be distributed based on weight. This will give more flexibility for customers to manage the unused bandwidth. MEF 10.3 has already defined an algorithm on how to share the unused bandwidth from higher rank flows to lower rank flows (i.e., the waterfall or cascading model). The systems and methods described herein utilize these existing approaches with modifications so that the metering algorithm can take advantage of setting a maximum rate in terms of percentage or weight of the total unused bandwidth. The following are some of the requirements for the modified metering algorithm.

Flows configured with maximum rate values in terms of weights shall always have a lower rank than flows configured with an absolute value. That is, all the flows configured with the absolute value of the maximum rate MUST be together and MUST have a higher rank than other flows in the envelope.

A maximum number of tokens allowed to be added for a flow can be restricted either by $CIR_{max}/EIR_{max}$ absolute value or based on the weights.

When unused bandwidth is distributed based on weight, then unused tokens from lower rank flows can also be utilized by higher rank flows whereas unused tokens from the lower rank flows cannot be utilized fairly by the higher rank flows as defined in MEF 10.3 algorithm.

MEF 10.3 Bandwidth Profiling Algorithm

The bandwidth profile algorithm in MEF 10.3 can be configured such that bandwidth that is not used by one bandwidth profile flow can be reallocated to other bandwidth profile flows in the same envelope. The significance of the ranking of the bandwidth profile flows is that it controls how the algorithm reallocates unused bandwidth from a given bandwidth profile flow to another bandwidth profile flow.

The parameters for each bandwidth profile flow of rank i=1, 2, . . . , n are:

Committed Information Rate per Bandwidth Profile Flow ($CIR^i$) expressed as bits per second. This parameter limits the average rate in bits per second of Service Frames that will be declared Green by the Bandwidth Profile.

Maximum Committed Information Rate per Bandwidth Profile Flow ($CIR_{max}^i$) expressed as bits per second. This parameter limits the rate of tokens added to the committed token bucket. $CIR^i$ and $CIR_{max}^i$ must be ≥0.

Committed Burst Size per Bandwidth Profile Flow ($CBS^i$) expressed as bytes. This parameter limits the maximum number of bytes available for a burst of Service Frames sent at the UNI line rate that will be declared Green by the Bandwidth Profile.

Excess Information Rate per Bandwidth Profile Flow ($EIR^i$) expressed as bits per second. This parameter limits the average rate in bits per second of Service Frames that will be declared Yellow by the Bandwidth Profile.

Maximum Excess Information Rate per Bandwidth Profile Flow ($EIR_{max}^i$) expressed as bits per second. This parameter limits the rate of tokens added to the excess token bucket. $EIR^i$ and $EIR_{max}^i$ must be ≥0.

Excess Burst Size per Bandwidth Profile Flow ($EBS^i$) expressed as bytes. This parameter limits the maximum number of bytes available for a burst of Service Frames sent at the UNI line rate that will be declared Yellow by the Bandwidth Profile.

Coupling Flag per Bandwidth Profile Flow ($CF^i$). This parameter determines whether or not overflow tokens not used for Service Frames declared Green can be used as Yellow tokens. $CF^i$ must have only one of two possible values—0 or 1. If $CF^0=1$ for an envelope, then $CF^i$ must equal 0 for all bandwidth profile flows mapped to the envelope.

Color Mode per Bandwidth Profile Flow ($CM^i$). This parameter indicates whether the color-aware or color-blind property is employed by the Bandwidth Profile.

Envelope and Rank ($ER^i$) a pair <Envelope ID, rank>. The Envelope ID indicates the Envelope that the Bandwidth Profile Flow belongs to and the rank i is a positive integer that specifies the rank of the Bandwidth Profile Flow within the Envelope.

Each Service Frame is classified to determine which, if any, Envelope is applicable to the Service Frame. Operation of the Bandwidth Profile algorithm is governed by the parameters, <$CIR^i$, $CIR_{max}^i$, $CBS^i$, $EIR^i$, $EIR_{max}^i$, $EBS^i$, $CF^i$, $CM^i$, $ER^i$> for i=1, 2, . . . , n and $CF^0$. The algorithm declares each Service Frame to be compliant or non-compliant relative to the Bandwidth Profile. The level of compliance is expressed as one of three colors, Green, Yellow, or Red.

The Bandwidth Profile algorithm is said to be in color-aware mode for Bandwidth Profile Flow i when each Service Frame in Bandwidth Profile Flow i that already has a level of compliance (i.e., a color) associated with it via the Color Identifier has that color taken into account in determining the level of compliance by the Bandwidth Profile algorithm. The Bandwidth Profile algorithm is said to be in color-blind mode for Bandwidth Profile Flow i when the color (if any) already associated with each Service Frame in Bandwidth Profile Flow i is ignored by the Bandwidth Profile Algorithm.

A token bucket model is used to describe the Bandwidth Profile behavior. Each Bandwidth Profile Flow i has a committed token bucket that can contain up to $CBS^i$ tokens, and an excess token bucket that can contain up to $EBS^i$ tokens. Tokens for each bucket are sourced at a rate of $CIR^i$ and $EIR^i$ respectively. Tokens that overflow each bucket for a Bandwidth Profile Flow may be made available to other buckets depending on the setting of the Coupling Flags ($CF^i$) and what other Bandwidth Profile Flows are mapped to the Envelope. Tokens flowing into a bucket are limited to $CIR_{max}^i$ and $EIR_{max}^i$ respectively. Each Service Frame that maps to Bandwidth Profile Flow i will be declared Green, Yellow, or Red by the Bandwidth Profile algorithm, depending on the arrival time of the Service Frame, the Color of the Service Frame (if any), and the number of tokens in the committed and excess token buckets. When a Service Frame for Bandwidth Profile Flow i is declared Green a number of tokens equal to the length of that Service Frame is removed from the committed bucket for that Bandwidth Profile Flow. When a Service Frame for Bandwidth Profile Flow i is declared Yellow a number of tokens equal to the length of that Service Frame is removed from the excess bucket for that Bandwidth Profile Flow.

To specify the Bandwidth Profile behavior, the following functions are defined:

$B_C^i(t)$ and $B_E^i(t)$ represent the number of tokens in the committed and excess token buckets, respectively, for Bandwidth Profile Flow i at time t, for i=1, 2, . . . , n.

$T_C^i(t1, t2)$ and $T_E^i(t1, t2)$ represent the maximum number of tokens that might be added to the committed and excess token buckets, respectively, for Bandwidth Profile Flow i over the time interval t1 to t2, for i=1, 2, . . . , n.

$A_C^i(t1, t2)$ and $A_E^i(t1, t2)$ represent the number of tokens actually added to the committed and excess token buckets, respectively, for Bandwidth Profile Flow i over the time interval t1 to t2, for i=1, 2, . . . , n.

$O_C^i(t1, t2)$ and $O_E^i(t1, t2)$ represent the number of tokens that overflow the committed and excess token buckets, respectively, for Bandwidth Profile Flow i over the time interval t1 to t2, for i=1, 2, . . . , n.

$S_C^i(t1, t2)$ and $S_E^i(t1, t2)$ represent the number of tokens available to be shared to the committed and excess token buckets of Bandwidth Profile Flow i−1, respectively, from Bandwidth Profile Flow i over the time interval t1 to t2, for i=1, 2, . . . , n.

The maximum number of tokens that might be added to the committed token bucket, $T_C^i(t1, t2)$, includes tokens sourced at the Committed Information Rate ($CIR^i$) over the time interval and any tokens shared from the next higher rank Bandwidth Profile Flow. The maximum number of tokens that might be added to the excess token bucket, $T_E^i(t1, t2)$, includes tokens sourced at the Excess Information Rate ($EIR^i$) over the time interval, any tokens shared from the higher rank Bandwidth Profile Flow, and any overflow tokens from the committed token bucket that are allowed by the Coupling Flag ($CF^i$). Note that for the committed token bucket, Bandwidth Profile Flow n has no tokens shared from a higher rank since there are no Bandwidth Profile Flows with a rank higher than n. Therefore $S_C^{n+1}(t1, t2)=0$. For the excess token bucket there are no tokens shared from a rank higher than n, however depending on $CF^0$ there may be tokens shared from the overflow of the committed token bucket at rank 1. Therefore $S_E^{n+1}(t1, t2)=CF^0 \times O_C^1(t1, t2)$.

The following functions and variables are proposed as part of the modified metering algorithm in additions to the functions and variables defined in MEF 10.3.

$WFF^i$ is defined as a Weighted Flow Flag. This flag is defined to identify if the maximum allowed rate of the flow is configured using weight or an absolute value. If this flag is not set to 1 (True), a maximum allowed rate of the flow cannot be configured using weight. Flag is defined per flow and by default must be set to 0 (False). If weighted flow flag is set to true, then both committed and excess maximum rate need to be configured using weight.

$WFO_c^i(t1, t2)$ and $WFO_e^i(t1, t2)$ represent the overflow tokens of weighted flow i over the time interval t1 to t2, for i=1, 2 . . . n for committed token bucket and excess token bucket respectively. It will be calculated based on the below equations over the time interval t1 to t2.

$$WFO_c^i(t1, t2) =$$

$$WFF^i * \left( \frac{CIR^i}{8}(t2 - t1) - \min\left\{ \frac{CIR^i}{8}(t2 - t1), CBS^i - B_c^i(t1) \right\} \right)$$

-continued $$WFO_e^i(t1, t2) =$$

$$WFF^i * \left( \frac{EIR^i}{8}(t2 - t1) - \min\left\{ \frac{EIR^i}{8}(t2 - t1), EBS^i - B_e^i(t1) \right\} \right)$$

$TWFO_c(t1, t2)$ and $TWFO_e(t1, t2)$ represents the total number of overflow tokens from all the weighted flows in the envelope. This variable will not add any overflow tokens from the non-weighted flows. This is defined as $$TWFO_c(t1, t2) = \begin{cases} \sum_{i=1}^{n} WFO_c^i & \text{if } FWF = 1 \\ 0 & \text{Otherwise} \end{cases}$$

$$TWFO_e(t1, t2) = \begin{cases} \sum_{i=1}^{n} WFO_e^i & \text{if } FWF = 1 \\ 0 & \text{Otherwise} \end{cases}$$

*Where FWF is first weighted flow $AW_c^i$ and $AW_e^i$ represents the actual weight of the weighted flow "i" for committed and excess token bucket respectively. If there are overflow tokens present for any weighted flow then that flow will not use any of the unused tokens as flow itself is contributing to the total unused tokens. This is defined as $$AW_c^i(t1, t2) = \begin{cases} W_c^i & \text{if } WFO_c^i(t1, t2) = 0 \\ 0 & \text{otherwise} \end{cases} \text{ for } i = 1, 2 \ldots n$$

$$AW_e^i(t1, t2) = \begin{cases} W_e^i & \text{if } WFO_e^i(t1, t2) = 0 \\ 0 & \text{otherwise} \end{cases} \text{ for } i = 1, 2 \ldots n$$

$CAW_c^i$ and $CAW_e^i$ represents the cumulative actual weight of the weighted flow "i" for committed and excess token bucket respectively. Where i can be 1, 2 . . . n. Cumulative weight is the summation of the actual weights of all higher rank flows till flow−i.

$$CAW_c^i(t1,t2) = CAW_c^{i+1} + AW_c^i \text{ for } i=1,2 \ldots n$$

$$CAW_e^i(t1,t2) = CAW_e^{i+1} + AW_e^i \text{ for } i=1,2 \ldots n$$

$TAW_c$ and $TAW_e$ represents the total actual weight of the envelope for committed and excess token bucket respectively. This is defined as $$TAW_c(t1, t2) = \sum_{i=1}^{n} AW_c^i$$

$$TAW_e(t1, t2) = \sum_{i=1}^{n} AW_e^i$$

With the above functions and variables, the maximum number of tokens added to committed and excess token bucket for any flow "i" can be derived as $$T_{cmax}^i(t1, t2) =$$

$$\begin{cases} \frac{CIR_{max}^i}{8}(t2 - t1) & \text{if } WFF^i = 0 \\ \frac{CIR^i}{8}(t2 - t1) + \frac{AW_c^i}{TAW_c - CAW_c^{i+1}}(S_c^{i+1} + TWFO_c(t1, t2)) & \text{otherwise} \end{cases}$$

for i = 1, 2 ... n

-continued $$T_{emax}^i(t1, t2) = \begin{cases} \dfrac{EIR_{max}^i}{8}(t2 - t1) & \text{if } WFF^i = 0 \\ \dfrac{EIR^i}{8}(t2 - t1) + \dfrac{AW_e^i}{TAW_e - CAW_e^{i+1}}(S_e^{i+1} + TWFO_e(t1, t2)) & \text{otherwise} \end{cases}$$

for $i = 1, 2 \ldots n$

Modified Functions and Variables Already Defined by MEF 10.3 Algorithm $T_C^i(t1, t2)$ and $T_e^i(t1, t2)$ represent the maximum number of tokens that might be added to the committed and excess token bucket for bandwidth profile flow-i over time interval t1 to t2. Total number of overflowed tokens from weighted flows has been added to the first weighted flow and then these tokens will be added to the next lower rank flow in a cascaded manner. Even though all the tokens have been added but only actual allowed tokens will be limited by $T_{cmax}^i(t1, t2)$ and $T_{emax}^i(t1, t2)$.

$$T_c^i(t1, t2) = \dfrac{CIR^i}{8}(t2 - t1) + S_c^{i+1}(t1, t2) + TWFO_c(t1, t2) \text{ for } i = 1, 2 \ldots n$$

$$T_e^i(t1, t2) = \dfrac{EIR^i}{8}(t2 - t1) + S_e^{i+1}(t1, t2) + TWFO_e(t1, t2) + CF^i * O_c^i(t1, t2) \text{ for } i = 1, 2 \ldots n$$

$A_c^i(t1, t2)$ and $A_e^i(t1, t2)$ represent the actual number of tokens added to the committed and excess token bucket respectively for bandwidth profile flow-i over time interval t1 to t2.

$A_c^i(t1,t2) = \min\{T_c^i(t1,t2), CBS^i - B_c^i(t1), T_{cmax}^i(t1,t2)\}$
for $i=1,2 \ldots n$ $A_e^i(t1,t2) = \min\{T_e^i(t1,t2), EBS^i - B_e^i(t1), T_{emax}^i(t1,t2)\}$
for $i=1,2 \ldots n$ $O_c^i(t1, t2)$ and $O_e^i(t1, t2)$ represent the number of tokens that overflow from the committed and excess token bucket respectively for bandwidth profile flow-i over time interval t1 to t2. As the algorithm has already taken care of overflow tokens from weighted flows, so those tokens need to be adjusted for weighted flows.

$O_c^i(t1,t2) = T_c^i(t1,t2) - A_c^i(t1,t2) - WFO_c^i(t1,t2)$
for $i=1,2 \ldots n$ $O_e^i(t1,t2) = T_e^i(t1,t2) - A_e^i(t1,t2) - WFO_e^i(t1,t2)$
for $i=1,2 \ldots n$ $S_c^i(t1, t2)$ and $S_e^i(t1, t2)$ represent the number of tokens available to be shared to the committed and excess token buckets of bandwidth profile flow (i-1) respectively over time interval t1 to t2.

$S_c^i(t1,t2) = (1-CF^i) * O_c^i(t1,t2)$ for $i=1,2 \ldots n$ $S_e^i(t1,t2) = O_e^i(t1,t2)$ for $i=1,2 \ldots n$ With the above parameters, the metering algorithm is defined in FIG. 1 which is a flowchart of the MEF 10.3 metering approach.

Example

Let's take an example where 600 Mbps bandwidth is assigned to an envelope (based off an EVC), and the envelope has three bandwidth profile flows for three different Class of Service (CoS) values (H, M, L). The configuration of each flow within the envelope is defined in table 1 as per the MEF 10.3 algorithm. For simplicity and illustration purposes, EIR and $EIR_{max}$ are set to 0. In the below example, tokens are sourced from flow-H, and only unused tokens are distributed among flow-M and flow-L.

TABLE 1

Flow configuration based on MEF 10.3

| CoS Value | CIR | $CIR_{max}$ | EIR | $EIR_{max}$ |
|---|---|---|---|---|
| H | 600 | 100 | 0 | 0 |
| M | 0 | 250 | 0 | 0 |
| L | 0 | 600 | 0 | 0 |

Table 2 captures the input and output meter rate for different scenarios based on the configuration defined in Table 1.

TABLE 2 input and output meter rate for different scenarios

| Scenario | Input Rate | | | Meter Output Rate | | |
|---|---|---|---|---|---|---|
| No | H | M | L | H | M | L |
| 1 | 600 | 600 | 600 | 100 | 250 | 250 |
| 2 | 0 | 600 | 600 | 0 | 250 | 350 |
| 3 | 0 | 0 | 600 | 0 | 0 | 600 |
| 4 | 600 | 0 | 600 | 100 | 0 | 500 |
| 5 | 0 | 100 | 600 | 0 | 100 | 500 |
| 6 | 50 | 600 | 600 | 50 | 250 | 300 |
| 7 | 50 | 100 | 600 | 50 | 100 | 450 |
| 8 | 50 | 100 | 100 | 50 | 100 | 100 |

Table 3 captures the configuration where unused bandwidth distribution is configured in terms of percentage as proposed via this systems and methods. This configuration is a mix of absolute and weighted $CIR_{max}$ value. Flow-H is configured with absolute value (100 Mbps) whereas flow-M and flow-L are configured with percentage values. As per the configuration, unused bandwidth will be distributed equally between flow-M and flow-L.

TABLE 3

Flow configuration based on the modified algorithm

| CoS Value | CIR | $CIR_{max}$ | EIR | $EIR_{max}$ |
|---|---|---|---|---|
| H | 600 | 100 | 0 | 0 |
| M | 0 | 50% | 0 | 0 |
| L | 0 | 50% | 0 | 0 |

Table 4 captures the input and output meter rate for different scenarios based on the configuration defined above and clearly shows the difference in behavior from the already known methods. As per the below table, it can be clearly observed that unused bandwidth from flow-L can be utilized by flow-M.

TABLE 4 input and output meter rate for different scenarios with the modified algorithm

| Scenario | Input Rate | | | Meter Output Rate | | |
|---|---|---|---|---|---|---|
| No | H | M | L | H | M | L |
| 1 | 600 | 600 | 600 | 100 | 250 | 250 |
| 2 | 0 | 600 | 600 | 0 | 300 | 300 |
| 3 | 0 | 0 | 600 | 0 | 0 | 600 |
| 4 | 600 | 0 | 600 | 100 | 0 | 500 |
| 5 | 0 | 100 | 600 | 0 | 100 | 500 |
| 6 | 50 | 600 | 600 | 50 | 275 | 275 |
| 7 | 50 | 100 | 600 | 50 | 100 | 450 |
| 8 | 50 | 100 | 100 | 50 | 100 | 100 |

Weights

The weights are provided (i.e., configured) by the "user" (e.g., Network Operator or Service Provider). It is the Service Provider that decides how they want to distribute the client traffic that they want to grant into their network and by what distribution. For example, a Service Provider may want to provide the following for a "Branch Office":

Real-Time Video traffic will be guaranteed 10 units (maximum) of bandwidth on a 100-unit connection; Business Critical (Gold) traffic will get a minimum of 65% of the available bandwidth, while Business Transactional (Silver) traffic will get a minimum of 30% of the available bandwidth, and Best Effort (Internet) traffic will get a minimum of 5% of the available bandwidth.

The approach described herein allows a Service Provider (via algorithmic extensions to the MEF 10.3 metering functions) to support the aforementioned. Before this, the only way that this could be supported was via egress Quality of Service (QoS) functions such as a scheduler. The approach described herein provides this "real" desired capability by ingress QoS function.

That is, the functionality is supported on the ingress. Devices based upon commodity silicon provide a greater scale of ingress QoS functions over egress QoS functions. So, there are practical benefits to the system vendor and quite frankly to the Service Provider.

Fixed Versus Relative Allocation

Conventional approaches rely on fixed allocation which is different from a relative (variable) value approach. For fixed percentages, assume there is a pie, and A gets 50%, B gets 30%, and C gets 20%. With this scheme, even if A does not consume half of the pie, and if B and C want to consume as much as possible, B will still only ever get (max) 30% of the pie, and C will only get (max) 20% of the pie. The other 50% gets unused and is reserved for A. For example, where A does not consume any of the 50%, the distribution is:

| A | B | C |
|---|---|---|
| 0 | 30% | 20% |

Now suppose A, who is allowed to get (max) 50% of the pie, only consumes 25%. So, if B and C still want to consume as much as possible, B will still only ever get (max) 30% of the pie, and C will only get (max) 20% of the pie. The other 25% gets unused and is reserved for A. The distribution is:

| A | B | C |
|---|---|---|
| 25% | 30% | 20% |

The approached described herein addresses a relative (variable) value approached. Again, assume with the pie A gets 50%, B gets 30% (or available), and C gets 20% (of available). With this scheme, even if A does not consume half of the pie (let's assume A does not consume any of the pie), and if B and C want to consume as much as possible, B will still only ever get a 3:2 ratio of the remaining pie. This should work out to being B actually will get to consume 60% of the pie, and C will get to eat 40% of the pie. The distribution is:

| A | B | C |
|---|---|---|
| 0 | 60% | 40% |

Now, suppose A, who is allowed to get (max) 50% of the pie, only consumes 25%. So that means 75% needs to be distributed between B and C according to the percentages. The actual allocation of the remaining pie for B and C would be 45% for B and 30% for C.

| A | B | C |
|---|---|---|
| 25% | 45% | 30% |

The present disclosure can include a User Interface (UI) which supports configuration using percentage units and then there is the underlying scheme to support the percentage allocation.

Bringing the simple pie eating example above to a Telecom example, a Service Provider sells a customer (e.g., Hospital or Bank branch office) an allocation of bandwidth (e.g., 100M access). However, there is more. The Service Provider will say, the customer can get:

(1) Guaranteed (20M) Video traffic. This is very critical traffic that has low latency and approaching zero loss demands and must be treated throughout the network with high priority.

(2) The remainder is Opportunistic traffic which can include a. Business Critical Gold Data (65%), b. Business Transactional Silver Data (30%), and c. Best effort Internet traffic (5%).

However, if the customer (i.e., Branch office) is not using any Video Traffic, it still wants to use all 100M. This is where those relative percentages come in. At the end of the day, the customer (Branch office) can still get their 100M of access, because each traffic class is "relatively" governed.

Example Operation

Figure 2:
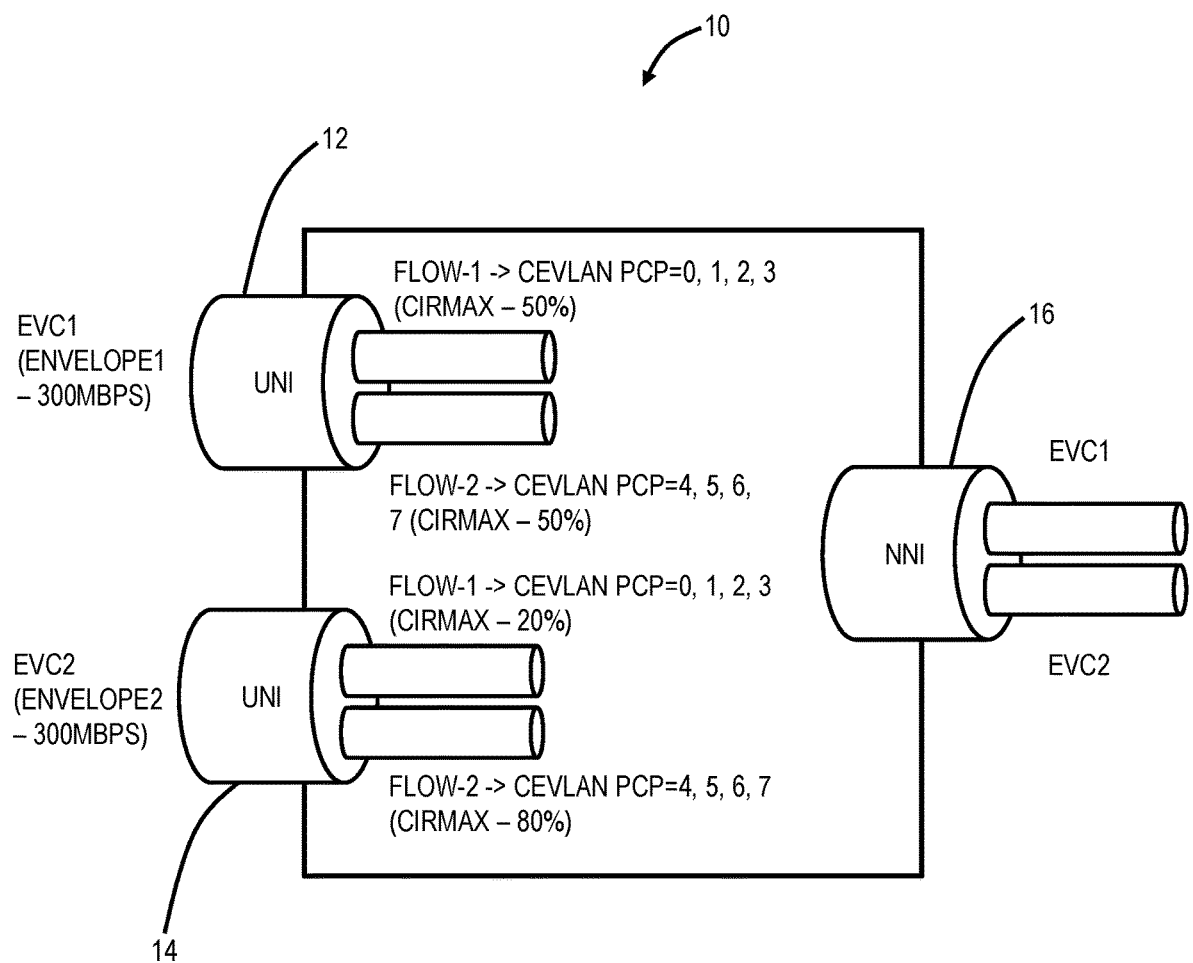
FIG. 2 is a block diagram of a node with two User-Network Interface (UNI) ports and one Network-Network Interface (NNI) port.

FIG. 2 is a block diagram of a node 10 with two User-Network Interface (UNI) ports 12, 14 and one Network-Network Interface (NNI) port 16. The node 10 can be configured to utilize the systems and methods for distributing unused bandwidth of metered flows in an envelope based on weights. In this example, both of the UNI ports 12, 14 have an envelope of 300 Mb/s. The UNI port 12 can include an Ethernet Virtual Circuit (EVC1 with two flows each with 50% of the CIR maximum rate and with different Priority Code Point (PCP) values. The UNI port 14 can include an Ethernet Virtual Circuit (EVC2) with two flows each with 20% and 80% of the CIR maximum rate and with different Priority Code Point (PCP) values. The systems and methods described herein provide ingress metering configured on both the UNI ports 12, 14. Distribution of traffic at the egress NNI port 16 can be analyzed to detect the implementation of the systems and methods.

Node

Figure 3:
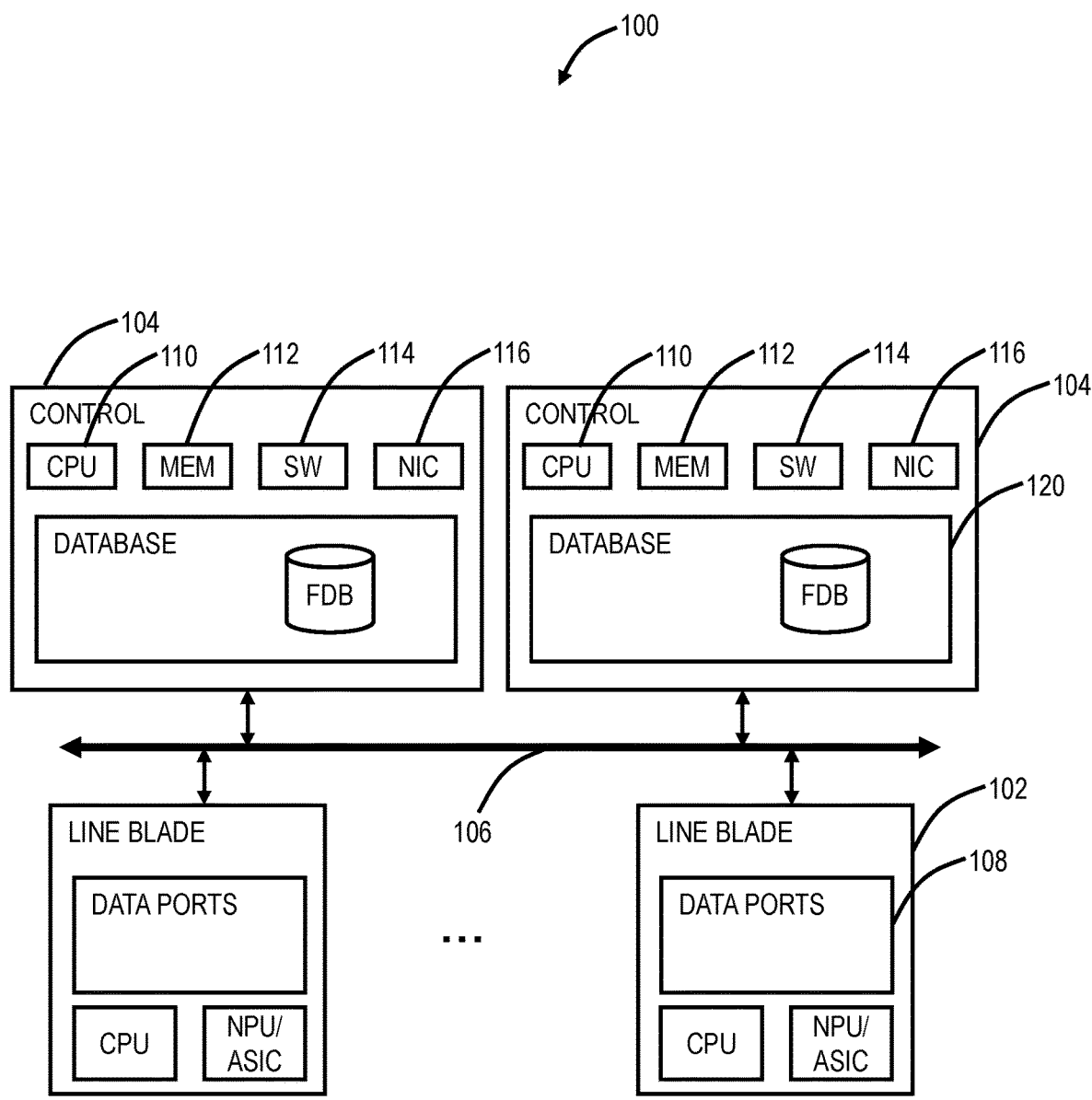
FIG. 3 is a block diagram of an implementation of a node.

FIG. 3 is a block diagram of an implementation of a node 100. In this embodiment, the node 100 is an Ethernet network switch, but those of ordinary skill in the art will recognize the systems and methods described herein can operate with other types of network elements and other implementations. In this embodiment, the node 100 includes a plurality of blades 102, 104 interconnected via an interface 106. The blades 102, 104 are also known as line cards, line modules, circuit packs, pluggable modules, etc. and generally refer to components mounted on a chassis, shelf, etc. of a data switching device, i.e., the node 100. Each of the blades 102, 104 can include numerous electronic devices and optical devices mounted on a circuit board along with various interconnects including interfaces to the chassis, shelf, etc.

Two example blades are illustrated with line blades 102 and control blades 104. The line blades 102 include data ports 108 such as a plurality of Ethernet ports. For example, the line blade 102 can include a plurality of physical ports disposed on an exterior of the blade 102 for receiving ingress/egress connections. Additionally, the line blades 102 can include switching components to form a switching fabric via the interface 106 between all of the data ports 108 allowing data traffic to be switched between the data ports 108 on the various line blades 102. The switching fabric is a combination of hardware, software, firmware, etc. that moves data coming into the node 100 out by the correct port 108 to the next node 100. "Switching fabric" includes switching units in a node; integrated circuits contained in the switching units; and programming that allows switching paths to be controlled. Note, the switching fabric can be distributed on the blades 102, 104, in a separate blade (not shown), or a combination thereof. The line blades 102 can include an Ethernet manager (i.e., a processor) and a Network Processor (NP)/Application Specific Integrated Circuit (ASIC).

The control blades 104 include a microprocessor 110, memory 112, software 114, and a network interface 116. Specifically, the microprocessor 110, the memory 112, and the software 114 can collectively control, configure, provision, monitor, etc. the node 100. The network interface 116 may be utilized to communicate with an element manager, a network management system, etc. Additionally, the control blades 104 can include a database 120 that tracks and maintains provisioning, configuration, operational data and the like. The database 120 can include a forwarding database (FDB) that may be populated as described herein (e.g., via the user triggered approach or the asynchronous approach). In this embodiment, the node 100 includes two control blades 104 which may operate in a redundant or protected configuration such as 1:1, 1+1, etc. In general, the control blades 104 maintain dynamic system information including Layer two forwarding databases, protocol state machines, and the operational status of the ports 108 within the node 100.

Figure 4:
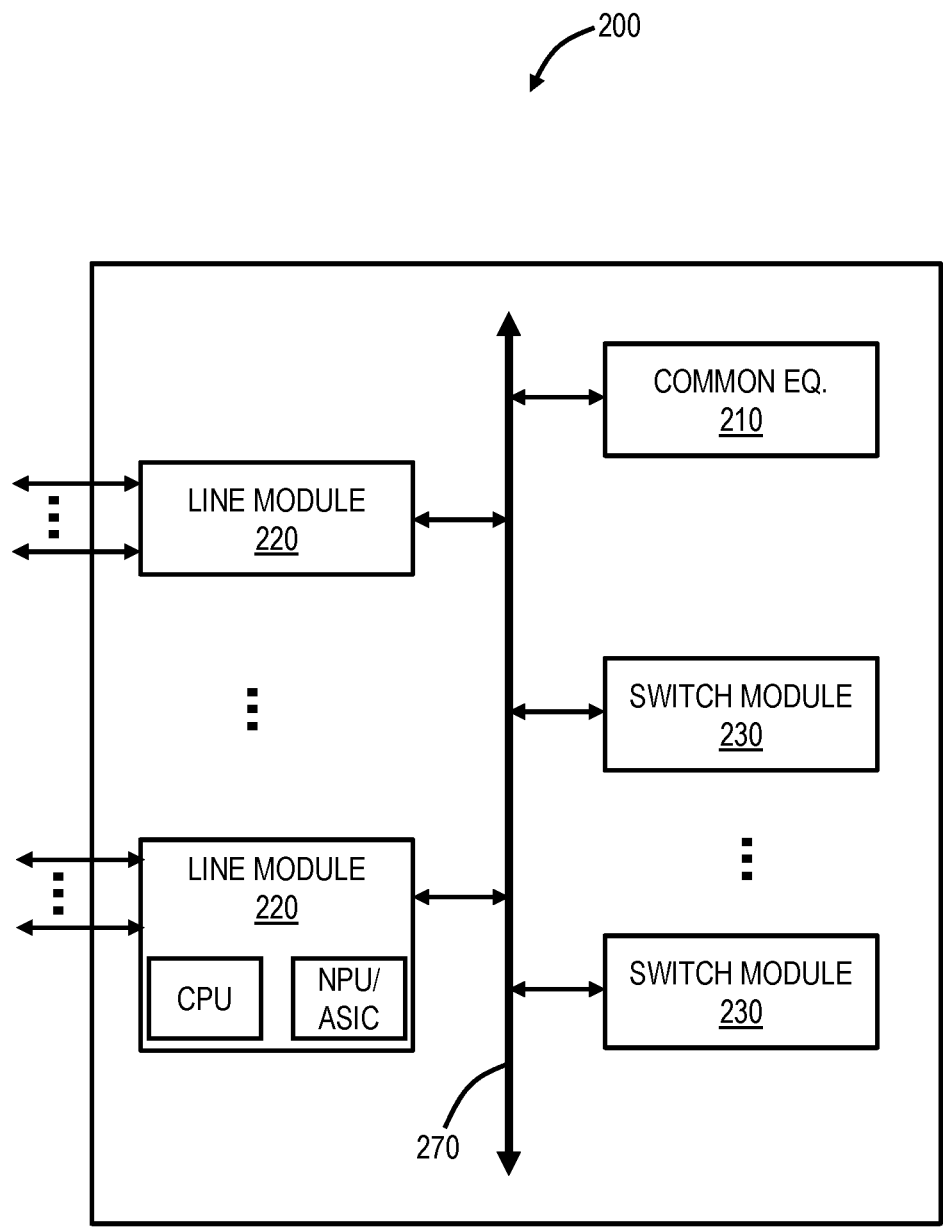
FIG. 4 is a block diagram of another implementation of a node.

FIG. 4 is a block diagram of another implementation of a node 200. For example, the node 100 can be a dedicated switch whereas the node 200 can be a multiservice platform. In an exemplary embodiment, the node 200 can be a nodal device that may consolidate the functionality of a multi-service provisioning platform (MSPP), digital cross-connect (DCS), Ethernet and Optical Transport Network (OTN) switch, dense wave division multiplexed (DWDM) platform, etc. into a single, high-capacity intelligent switching system providing Layer 0, 1, and 2 consolidation. In another exemplary embodiment, the node 200 can be any of an add/drop multiplexer (ADM), a multi-service provisioning platform (MSPP), a digital cross-connect (DCS), an optical cross-connect, an optical switch, a router, a switch, a WDM terminal, an access/aggregation device, etc. That is, the node 200 can be any system with ingress and egress signals and switching of packets, channels, timeslots, tributary units, wavelengths, etc. In the context of the systems and methods described herein, the node 200 includes packet switching with metering in addition to any other functionality.

In an exemplary embodiment, the node 200 includes common equipment 210, one or more line modules 220, and one or more switch modules 230. The common equipment 210 can include power; a control module; operations, administration, maintenance, and provisioning (OAM&P) access; and the like. The common equipment 210 can connect to a management system such as a network management system (NMS), element management system (EMS), or the like. The node 200 can include an interface 270 for communicatively coupling the common equipment 210, the line modules 220, and the switch modules 230 together. For example, the interface 270 can be a backplane, midplane, a bus, optical or electrical connectors, or the like. The line modules 220 are configured to provide ingress and egress to the switch modules 230 and external to the node 200. In an exemplary embodiment, the line modules 220 can form ingress and egress switches with the switch modules 230 as center stage switches for a three-stage switch, e.g., a three-stage Clos switch.

The line modules 220 can include a plurality of connections per module and each module may include a flexible rate and protocol support for any type of connection, such as, for example, 155 Mb/s, 622 Mb/s, 1 Gb/s, 2.5 Gb/s, 10 Gb/s, 40 Gb/s, 100 Gb/s, etc. The line modules 220 can include wavelength division multiplexing interfaces, short reach interfaces, and the like, and can connect to other line modules 220 on remote network elements, end clients, routers, switches, and the like. From a logical perspective, the line modules 220 provide ingress and egress ports to the node 200, and each line module 220 can include one or more physical ports. The switch modules 230 are configured to switch channels, timeslots, tributary units, wavelengths, etc. between the line modules 220. For example, the switch modules 230 can provide wavelength granularity (Layer 0 switching), SONET/SDH granularity; OTN granularity such as Optical Channel Data Unit-k (ODUk) Optical Channel Data Unit-flex (ODUflex), etc.; Ethernet granularity; and the like. Specifically, the switch modules 230 can include both Time Division Multiplexed (TDM) (i.e., circuit switching) and packet switching engines. The switch modules 230 can include redundancy as well, such as 1:1, 1:N, etc.

In context of the systems and methods described herein, the node 100 includes packet metering which can be performed by one or more meters, implemented in circuitry and located on the line blade 102, the control blade 104, in the switching fabric at some point, etc. Similar to the node 100, the node 200 includes packet switching through the line modules 220 and/or the switch modules 230. The node 200 includes packet metering which can be performed by one or more meters, implemented in circuitry and located on the line modules 220, the switch modules 230, the common equipment 210, etc. Specifically, the metering/marking process 40 can be implemented in circuitry, logic, hardware, firmware, software, and/or a combination thereof in the nodes 100, 200. Those of ordinary skill in the art will recognize the nodes 100, 200 can include other components that are omitted for illustration purposes, and that the systems and methods described herein contemplate using a plurality of different nodes with the nodes 100, 200 presented as an exemplary type of node. For example, in another exemplary embodiment, a node may not include the switch modules 230, but rather have the corresponding functionality in the line modules 220 (or some equivalent) in a distributed fashion. For the nodes 100, 200, other architectures providing ingress, egress, and switching are also contemplated for the systems and methods described herein. In general, the systems and methods described herein contemplate use with any node providing packet switching with metering.

Process of Ingress Packet Metering

Figure 5:
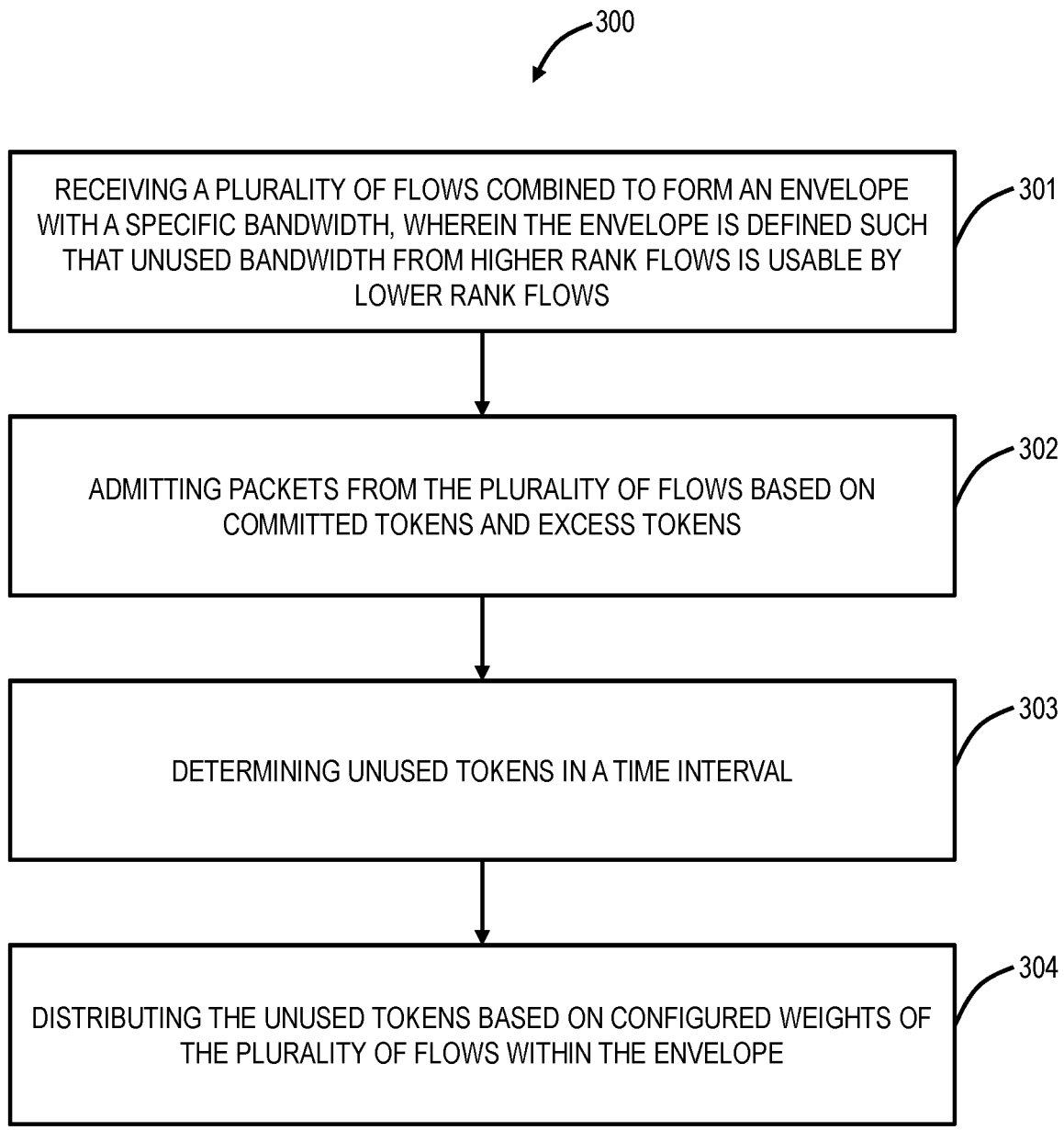
FIG. 5 is a flowchart of a process of ingress packet metering.

FIG. 5 is a flowchart of a process 300 of ingress packet metering. The process 300 includes receiving a plurality of flows combined to form an envelope with a specific bandwidth, wherein the envelope is defined such that unused bandwidth from higher rank flows is usable by lower rank flows (step 301); admitting packets from the plurality of flows based on committed tokens and excess tokens (step 302); determining unused tokens in a time interval (step 303); and distributing the unused tokens based on configured weights of the plurality of flows within the envelope (step 304). The unused tokens can be provided from a lower rank flow to a higher rank flow. The unused tokens can be determined utilizing Two Rate Three Color Marker (trTCM) metering. The receiving, the admitting, and the determining can be performed at a User-Network Interface (UNI), a Network-Network Interface (NNI), or an External NNI (ENNI) port in a node. Each of the plurality of frames can be a set of service frames arriving at a User-Network Interface (UNI), a Network-Network Interface (NNI), or an External NNI (ENNI) port that meets a specific criterion. The determining unused tokens can include computing overflow tokens of each of the plurality of weighted flows; and summing the overflow tokens for each of the plurality of weighted flows. The distribution of the unused tokens can be based in part on a hierarchal metering algorithm in MEF 10.3 which is modified to support weights for each of the plurality of flows.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of ingress packet metering comprising:
receiving a plurality of flows combined to form an envelope with a specific bandwidth,
wherein the envelope is defined such that unused bandwidth from higher rank flows is usable by lower rank flows;
admitting packets from the plurality of flows based on committed tokens and excess tokens;
assigning a respective weight to each flow in the plurality of flows such that each flow in the plurality of flows is allocated an initial, respective amount of bandwidth;
determining, for a time interval, unused tokens from one or more flows of the plurality of weighted flows, wherein the determining unused tokens comprises summing overflow tokens proportionally for each of the plurality of weighted flows; and
distributing the determined, unused tokens to other flows of the plurality of weighted flows within the envelope based on the respective, assigned weights of the other flows such that:
the unused tokens are distributed among the other flows relative to the weights assigned thereto,
each flow in the other flows exceeds their initial, respective amount of the bandwidth allocated therefore due to the unused tokens distributed thereto, and
lower rank flows and the higher rank flows use the unused bandwidth based on the weights,
wherein the distributing of the determined, unused tokens is in accordance with a bandwidth profile algorithm in Metro Ethernet Forum (MEF) 10.3 section 12 which is modified to support weight-based bandwidth allocation for each of the plurality of weighted flows.

2. The method of claim 1,
wherein the unused tokens are provided from a lower rank flow to a higher rank flow.

3. The method of claim 1,
wherein the unused tokens are determined utilizing Two Rate Three Color Marker (trTCM) metering.

4. The method of claim 1,
wherein the receiving, the admitting, and the determining are performed at
a User-Network Interface (UNI),
a Network-Network Interface (NNI), or
an External NNI (ENNI) port in a node.

5. The method of claim 1,
wherein each of a plurality of frames is a set of service frames arriving at
a User-Network Interface (UNI),
a Network-Network Interface (NNI), or
an External NNI (ENNI) port
that meets a specific criterion.

6. The method of claim 1, wherein the determining unused tokens further comprises: computing the overflow tokens of each of the plurality of weighted flows.

7. A node comprising:
a plurality of ports;
a switch fabric between the plurality of ports, wherein a port of the plurality of ports is configured to receive a plurality of flows; and
a processor communicatively coupled to the port, the processor configured to:
combine the received plurality of flows to form an envelope with a specific bandwidth, wherein the envelope is defined such that unused bandwidth from higher rank flows is usable by lower rank flows,
admit packets from the plurality of flows based on committed tokens and excess tokens,
assign a respective weight to each flow in the plurality of flows such that each flow in the plurality of flows is allocated an initial, respective amount of bandwidth,
determine, for a time interval, unused tokens from one or more flows of the plurality of weighted flows, wherein the determining unused tokens comprises summing overflow tokens proportionally for each of the plurality of weighted flows, and
distribute the unused tokens to other flows of the plurality of weighted flows within the envelope based on assigned weights of the other flows such that:
the unused tokens are distributed among the other flows relative to the weights assigned thereto,
each flow in the other flows exceeds their initial, respective amount of the bandwidth allocated therefore due to the unused tokens distributed thereto, and
lower rank flows and the higher rank flows use the unused bandwidth based on the weights,
wherein the distributing of the determined, unused tokens is in accordance with a bandwidth profile algorithm in Metro Ethernet Forum (MEF) 10.3 section 12 which is modified to support weight-based bandwidth allocation for each of the plurality of weighted flows.

8. The node of claim 7,
wherein the unused tokens are provided from a lower rank flow to a higher rank flow.

9. The node of claim 7,
wherein the unused tokens are determined utilizing Two Rate Three Color Marker (trTCM) metering.

10. The node of claim 7,
wherein the port is a
User-Network Interface (UNI),
a Network-Network Interface (NNI), or
an External NNI (ENNI) port.

11. The node of claim 7,
wherein each of a plurality of frames is a set of service frames arriving at
a User-Network Interface (UNI),
a Network-Network Interface (NNI), or
an External NNI (ENNI) port
that meets a specific criterion.

12. The node of claim 7, wherein the unused tokens are determined by a computation of the overflow tokens for each of the plurality of weighted flows.

13. An apparatus comprising:
circuitry configured to receive a plurality of flows combined to form an envelope with a specific bandwidth, wherein the envelope is defined such that unused bandwidth from higher rank flows is usable by lower rank flows;
circuitry configured to admit packets from the plurality of flows based on committed tokens and excess tokens;
circuitry configured to assign a respective weight to each flow in the plurality of flows such that each flow in the plurality of flows is allocated an initial, respective amount of bandwidth;
circuitry configured to determine, for a time interval, unused tokens from one or more flows of the plurality of flows by summing overflow tokens proportionally for each of the plurality of weighted flows; and
circuitry configured to distribute the unused tokens to other flows of the plurality of weighted flows within the envelope based on assigned weights of the other flows such that:
the unused tokens are distributed among the other flows relative to the weights assigned thereto,
each flow in the other flows exceed their initial, respective amount of bandwidth allocated therefore due to the unused tokens distributed thereto, and
lower rank flows and the higher rank flows use the unused bandwidth based on the weights,
wherein the distributing of the determined, unused tokens is in accordance with a bandwidth profile algorithm in Metro Ethernet Forum (MEF) 10.3 section 12 which is modified to support weight-based bandwidth allocation for each of the plurality of weighted flows.

14. The apparatus of claim 13,
wherein the unused tokens are provided from a lower rank flow to a higher rank flow.

15. The apparatus of claim 13,
wherein the unused tokens are determined utilizing Two Rate Three Color Marker (trTCM) metering.

16. The apparatus of claim 13,
wherein the circuitry configured to receive is at
a User-Network Interface (UNI),
a Network-Network Interface (NNI), or
an External NNI (ENNI) port in a node.

17. The apparatus of claim 13,
wherein each of a plurality of frames is a set of service frames arriving at
a User-Network Interface (UNI),
a Network-Network Interface (NNI), or
an External NNI (ENNI) port
that meets a specific criterion.

* * * * *